June 10, 1941.  E. O. YOUNG  2,245,243
DAMPER OR VALVE OPERATING MECHANISM
Filed Aug. 11, 1938
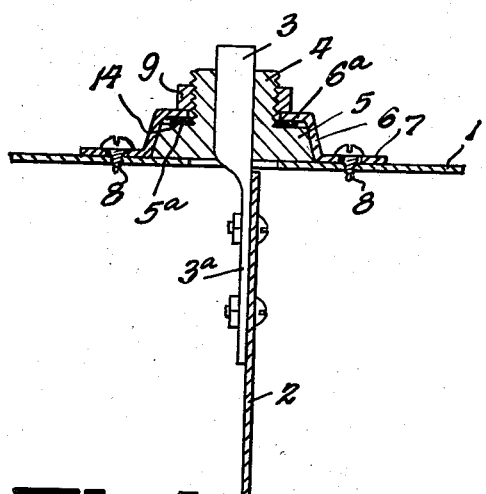
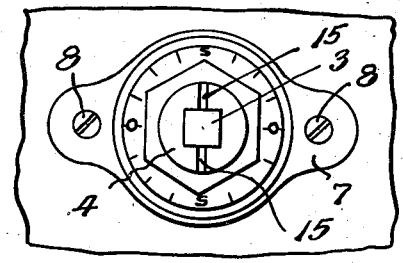
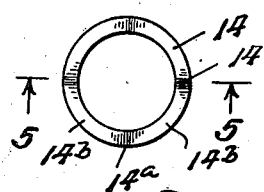
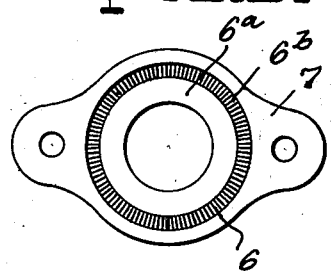
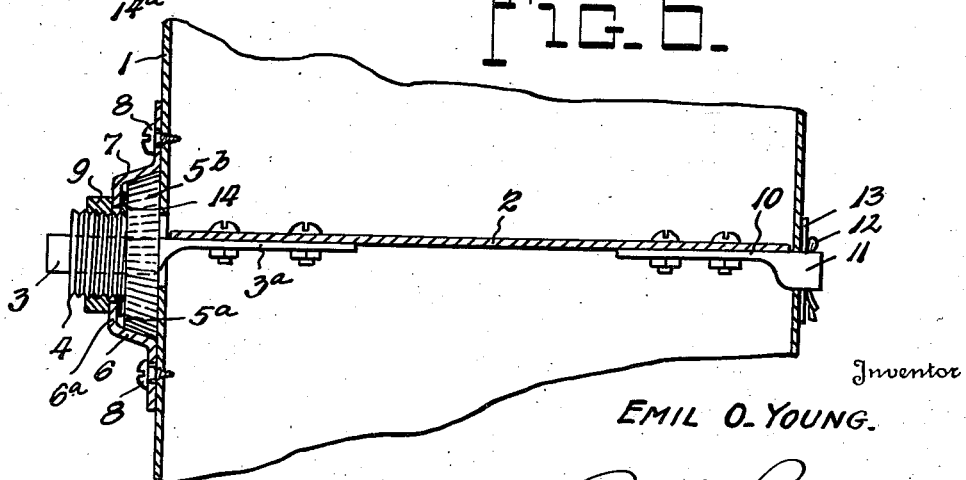
Inventor
EMIL O. YOUNG.
By Robb & Robb
ATTORNEYS Patented June 10, 1941

2,245,243

UNITED STATES PATENT OFFICE 2,245,243

DAMPER OR VALVE OPERATING MECHANISM

Emil O. Young, Cleveland, Ohio

Application August 11, 1938, Serial No. 224,363

2 Claims. (Cl. 116—125)

The present invention provides improvements in a type of damper control means for air, smoke, and like flues, as disclosed by my Letters Patent No. 1,729,319 issued September 24, 1929. The invention includes primarily certain improvements upon the special construction of such damper or valve control which is embodied in my copending application for Patent Serial No. 96,116, filed August 14, 1936, now Patent No. 2,130,476. In this latter construction of damper control means I employ a suitable actuator for turning the damper, to which the damper or valve blade itself is attached. This actuator is interlocked with an adjusting sleeve including a holding member that is caused to frictionally engage and frictionally interlock with a supporting or face plate. To establish this frictional interlock or engagement according to the construction of my said Patent No. 2,130,476, the adjusting sleeve is provided with a holding disc having peripheral roughened or serrated portions to engage a part of the said face plate.

In the use of the improvements of my said Patent No. 2,130,476 I have found that the adjusting and holding means for maintaining the damper or valve in its adjusted positions of closing or opening the flue, or intermediate such positions, is very effective. However, in the practical use of my said improvements, after the damper has remained in one of its adjusted positions for some time, the engagement of the holding disc with the face or supporting plate portion cooperating therewith is such that upon loosening the lock nut provided the said holding disc and face plate do not readily separate so as to release the damper actuating member for turning movement. It is undesirable to resort to pounding of the sleeve that carries the holding disc in order to disestablish the interengagement of the disc and supporting plate, especially because the sleeve is threaded and possible mutilation of the threads may occur.

I have found, therefore, in practice, that it is highly desirable to utilize, intermediate the outer surface of the holding or locking disc and the inner adjacent surface of the face plate, a special spring. This spring is peculiarly designed so that when the lock nut is unscrewed the spring will act with automatic effect to push the holding or locking disc inwardly to disengage it from the face plate and permit an immediate manipulation of the actuating member of the damper for turning it to a desired adjusted position. By the use of this improvement, all difficulty that might arise due to the sticking or failure of the holding disc to completely disengage from the face plate for permitting turning of the actuating member, is avoided. The essential advantage of the invention is therefore to make the device so-called "fool proof" and capable of being readily operated by any person who is familiar with the general mode of adjusting the parts for turning of the damper and locking same in the desired adjusted position.

The preferred exemplification of my invention is illustrated in the accompanying drawing, in which Figure 1 is a vertical sectional view through the damper operating and adjusting parts of my device as they are applied to a wall of a flue or other conduit, the latter, as well as the damper blade proper, being illustrated in a fragmentary manner.

Figure 2 is a front view in elevation of the device, the flue illustrated broken away.

Figure 3 is a view in elevation looking toward the inner side of the supporting or face plate alone.

Figure 4 is a plan view of the release spring.

Figure 5 is a cross sectional view through the release spring.

Figure 6 is a vertical sectional view of an ordinary air or other type of flue, partly broken away, and illustrating my damper and operating mechanism completely assembled and ready for use.

Similar reference characters refer to like parts throughout the following description and in the drawing.

Specifically describing the detail features of the invention, 1 in the drawing designates the flue or conduit or other passage in which the damper or valve of the invention designated 2 is intended to be arranged. The damper 2 is secured by suitable screws to the inner end 3a of the actuating and adjusting member 3. This actuating member extends through a wall of the flue 1 and through an opening in a sleeve 4 which constitutes an adjusting and holding member. The outer portion of the actuating member 3 is of square form, preferably, in cross section, and the opening of the member 4 that receives the part 3 is likewise square.

Externally the sleeve 4 is threaded at its outer portion, and at its inner portion it is formed with an enlargement in the form of a holding or locking disc 5. The periphery of the disc 5 is formed on a slant, or is tapered, in other words, so as to conform with the taper of the adjacent inner wall of a hollow boss 6 that is a part of the face plate 7. The plate 7 is attached by screws 8 to a wall of the flue as seen in the drawing, and not intended to be removed once it is placed in position.

The thickness of the disc 5, so to speak, is less than the depth or extent of protrusion of the boss 6 from the plane of the plate 7, so that there is a slight space somewhat exaggerated as seen in Figure 1, between the outer or top portion 6a of the boss 6 and the outer surface or side 5a of the disc 5.

The adjacent peripheral surface of the disc 5 and the inner surface of the boss 6 will preferably be roughened or serrated somewhat after the manner illustrated in Figure 3 at 6b in relation to said plate 7. In Figure 6 the serrated portion of the periphery of the disc 5 is indicated at 5b. The purpose of these serrated portions will be apparent hereinafter.

The screw threaded portion of the sleeve or adjusting member 4 passes through an opening in the part 6a of the plate 7, and a lock nut 9 may be screwed thereupon, as evident from Figures 1 and 6. On the outer surface of the portion 6a of the face plate are indicia markings including the letter "S" for indicating a shut position of the damper, the letter "O" for indicating an open position of the damper, and indicating lines or marks intermediate such letters for indicating the different angular positions in which the damper may rest intermediate its shut and open positions.

The construction of my invention as thus far described is practically that as presented in my previous Patent No. 2,130,476. It is notable that the end of the damper 2 remote from the adjusting means described is supported by a plate 10 having a pintle bearing member 11, and a cotterpin 12 may be used to hold a washer 13 on the protruding portion of said part 11.

Interposed between the part 6a of the plate 7 and the outermost portion 5a of the disc 5 is the annular spring 14, seen in Figures 4 and 5 to best advantage, which spring is formed with hill and dale portions by being peculiarly bent in precisely the manner illustrated, the hill portions being designated 14a and the dale portions 14b.

With the foregoing in view, it is noted that the construction of my invention as described herein is substantially like that of my Patent No. 2,130,476, with the exception of the use of the spring 14 and the fact that the outer end of the sleeve adjusting and holding member 4 is formed with the indicia grooves 15 in line with each other at opposite sides of the part 3, said indicia grooves adapted to cooperate with the "S", "O" and intermediate line markings on the outer surface of the member 6a whereby to show the position to which the damper 2 is adjusted.

In the operation of the invention, assuming that the nut 9 is loose or partially unscrewed and that the damper 2 is free to be turned by the actuating member 3, a wrench or any suitable tool may be applied to the projecting end of the member 3 and by turning said wrench with the part 3, the damper may be adjusted to shut, open, or any intermediate position desired. When the damper has been adjusted as required, the same wrench or any other tool may be applied to the lock nut 9 to screw the said nut firmly against the part 6a of the boss 6 of the face plate, and at the same time pull outwardly upon the adjusting member 4 so as to cause the periphery of the disc 5 to engage the roughened or serrated portion 6b of the hollow boss 6. Such engagement is enhanced, so far as efficiency is concerned, by reason of the tapering inner formation of the boss 6 and the tapering formation of the peripheral portion of the member 5. When the parts 5 and 6 are thus interengaged, there will be no liability of turning of the damper or of accidental shifting of it from its pre-set position.

The subsequent adjustment of the damper 2 will be effected by reverse operation to that above mentioned, which involves the screwing inwardly of the lock nut 9 and the flattening of the spring 14 by such action. In other words, the reverse operation would require that the nut 9 first be loosened by unscrewing movement and as soon as this is accomplished the spring 14 acts with automatic effect to force the disc 5 inwardly toward the flue wall 1 and thus separates the coacting serrated portions of the parts 5 and 6 quickly so that the adjusting member 4 is freed and ready to be turned by the application of the proper tool.

The peculiar formation of the spring 14 is such that it inherently possesses a certain amount of expansion transverse to the plane of its body notwithstanding that by the tightening of the nut 4 it is caused to assume an almost flat condition. I have found that this peculiar form of spring is best adapted for the purposes of my invention and that other types of spring either cannot be accommodated in the space provided or will not act effectively for the purpose desired.

Having thus described my invention, what I claim as new and desire to secure by Letters Patent of the United States, is—

1. In a damper control mechanism, in combination, a supporting plate, an adjusting and holding member comprising a sleeve and a holding disc, said supporting plate and disc being formed with serrated surfaces adapted to be moved into cooperating engagement to interlock the disc and supporting plate against movement relative to each other when so engaged, a damper connected with the adjusting and holding member so as to turn only therewith, a part for moving the adjusting and holding member to cause said serrated surfaces to be engaged with one another to interlock said disc and plate to prevent unauthorized movement of the damper, and spring means intermediate the said disc and the said supporting plate for separating the serrated surfaces thereof when the said part is loosened to release the interlock between said plate and disc.

2. A damper control mechanism of the class described, comprising, in combination, a supporting plate provided with a hollow boss protruding therefrom, an adjusting and holding member including an externally threaded sleeve passing through the outermost portion of said boss and having a disc housed by the boss, the periphery of the disc and adjacent portion of the boss formed with serrated surfaces tapered and being adapted to be moved into interlocking engagement with each other for the holding of the disc and sleeve against rotation, a nut cooperating with the outermost portion of the boss and screwed upon the threaded portion of the sleeve so as to tighten the peripheral portion of the disc against the adjacent portion of the boss and thus interlock the adjusting and holding member against rotation, a damper, an actuating member for the damper extending through the said sleeve and disc which forms the adjusting and holding member and interlocked to turn therewith, and an annular spring interposed between the outermost portion of the boss of the supporting plate and the outer face of the disc adjacent its periphery for moving the disc and thus separating the interlocked portions of the disc and boss upon loosening of said nut on the sleeve.

EMIL O. YOUNG.